US011946635B1

(12) United States Patent
Huang

(10) Patent No.: US 11,946,635 B1
(45) Date of Patent: Apr. 2, 2024

(54) DESK LAMP WITH ALARM CLOCK AND LAMP BRIGHTNESS CONTROL

(71) Applicant: Shenzhen Bohui Technology Co., Ltd., Shenzhen (CN)

(72) Inventor: Xiaoqiang Huang, Shenzhen (CN)

( * ) Notice: Subject to any disclaimer, the term of this patent is extended or adjusted under 35 U.S.C. 154(b) by 0 days.

(21) Appl. No.: 18/457,266

(22) Filed: Aug. 28, 2023

(30) Foreign Application Priority Data

Aug. 18, 2023 (CN) ......................... 202322240741.4

(51) Int. Cl.

| | |
|---|---|
| ***F21V 33/00*** | (2006.01) |
| ***F21S 6/00*** | (2006.01) |
| ***F21V 1/04*** | (2006.01) |
| ***F21V 17/12*** | (2006.01) |
| ***F21V 19/00*** | (2006.01) |
| ***F21V 23/04*** | (2006.01) |
| *F21Y 115/10* | (2016.01) |

(52) U.S. Cl.
CPC .......... *F21V 33/0024* (2013.01); *F21S 6/003* (2013.01); *F21V 1/04* (2013.01); *F21V 17/12* (2013.01); *F21V 19/0065* (2013.01); *F21V 23/04* (2013.01); *F21Y 2115/10* (2016.08)

(58) Field of Classification Search
CPC .. F21V 33/0048; F21V 33/0024; F21S 6/003; F21W 2131/30
See application file for complete search history.

(56) References Cited

U.S. PATENT DOCUMENTS

| | | | | |
|---|---|---|---|---|
| 1,943,598 A * | 1/1934 | Gourley | G04C 19/02 | 368/10 |
| 3,034,281 A * | 5/1962 | Guidone | G04B 23/03 | 968/404 |
| 3,368,067 A * | 2/1968 | Paxinos | F21V 33/00 | 968/405 |
| 4,285,028 A * | 8/1981 | Sundin | F21V 33/0004 | 362/411 |
| 5,926,440 A * | 7/1999 | Chien | G04B 47/006 | 362/253 |
| 6,027,229 A * | 2/2000 | Wang | F21S 6/002 | 362/253 |
| 6,048,078 A * | 4/2000 | Wang | F21S 6/002 | 968/408 |
| 6,236,622 B1 * | 5/2001 | Blackman | G04G 13/023 | 368/79 |
| 7,824,061 B1 * | 11/2010 | Riedfort | F21S 6/002 | 362/276 |
| 8,499,593 B2 * | 8/2013 | Van De Sluis | G04G 15/003 | 368/10 |
| 8,867,318 B2 * | 10/2014 | Suen | G04G 11/00 | 368/244 |
| 10,012,959 B2 * | 7/2018 | Toda | G04G 13/02 | |
| 10,595,376 B2 * | 3/2020 | Soler | A61M 21/02 | |

(Continued)

*Primary Examiner* — Ismael Negron

(57) ABSTRACT

An desk lamp includes a control main board, an alarm clock module and a light-emitting element. The alarm clock module is electrically connected to the control main board, and the alarm clock module at least includes two alarm clock modes. The light-emitting element is electrically connected to the control main board. The desk lamp can not only be used as a lighting device for emitting lighting rays, but also provide an alarm clock function. A user can set different alarm clock modes and can set two or more alarm clocks at different time according to an actual need.

19 Claims, 5 Drawing Sheets

(56) References Cited

U.S. PATENT DOCUMENTS

| | | | | |
|---|---|---|---|---|
| 10,948,175 | B2 * | 3/2021 | Chien | F21V 33/0004 |
| 2008/0091250 | A1 * | 4/2008 | Powell | H05B 45/20 607/90 |
| 2008/0129654 | A1 * | 6/2008 | Bhavnani | G04C 3/005 345/59 |
| 2009/0278480 | A1 * | 11/2009 | Nunes | F21V 33/00 362/249.02 |
| 2010/0039792 | A1 * | 2/2010 | Meyers | H01R 25/006 362/183 |
| 2010/0244735 | A1 * | 9/2010 | Buelow, II | H05B 35/00 315/320 |

* cited by examiner

DESK LAMP WITH ALARM CLOCK AND LAMP BRIGHTNESS CONTROL

CROSS-REFERENCE TO RELATED APPLICATIONS

The application claims priority of Chinese patent application CN202322240741.4, filed on Aug. 18, 2023, which is incorporated herein by reference in its entireties.

TECHNICAL FIELD

The present disclosure relates to the field of desk lamps, in particular to a desk lamp.

BACKGROUND

In modern life, desk lamps, as a type of indoor lighting devices, are not only configured to provide light, but also have been gradually evolved into a functionally diversified device that can meet different needs of users. A traditional desk lamp usually only provides a basic lighting function, but with people's continuous pursuit for living standard and convenience, requirements for functions of desk lamps are also increasingly high. Therefore, it is necessary to provide a multifunctional desk lamp design with higher innovativeness, richer functionality and higher integrity, so as to meet the diverse needs in modern life.

SUMMARY

In order to overcome the shortcomings of the prior art, the present disclosure provides a desk lamp, including: a control main board; an alarm clock module, wherein the alarm clock module is electrically connected to the control main board, and the alarm clock module at least includes two alarm clock modes; and a light-emitting element, wherein the light-emitting element is electrically connected to the control main board.

As the improvement of the present disclosure, the desk lamp further includes a toggle button group; the toggle button group is electrically connected to the control main board and the alarm clock module; and the toggle button group includes a fifth working state and a sixth working state.

As the improvement of the present disclosure, the toggle button group includes a first toggle button and a second toggle button; the alarm clock module includes a first working mode and a second working mode; and when the toggle button group is triggered to be in the fifth working state, the first toggle button is configured to perform switching to and set the first working mode; and the second toggle button is configured to perform switching to and set the second working mode.

As the improvement of the present disclosure, the desk lamp includes a third toggle button and a fourth toggle button; the first working mode includes at least two alarm clock settings; the alarm clock settings include a workday setting and a non-workday setting; and the third toggle button and the fourth toggle button are configured to switch different alarm clock settings of the first working mode.

As the improvement of the present disclosure, the second working mode includes at least two alarm clock settings; the alarm clock settings include a workday setting and a non-workday setting; and the third toggle button and the fourth toggle button are configured to perform switching between different alarm clock settings of the second working mode.

As the improvement of the present disclosure, the desk lamp further includes a touch switch; the touch switch is electrically connected to the control main board; and the touch switch is configured to control brightness of the light-emitting element.

As the improvement of the present disclosure, the light-emitting element has three stages of brightness; when the touch switch is touched for the first time, the light-emitting element is turned on at the first stage of brightness; when the touch switch is touched for the second time, the light-emitting element is turned on at the second stage of brightness; when the touch switch is touched for the third time, the light-emitting element is turned on at the third stage of brightness; and when the touch switch is touched for the fourth time, the light-emitting element is turned off.

As the improvement of the present disclosure, the desk lamp further includes a power button; the power button is electrically connected to the control main board; and the power button includes a first working state and a second working state.

As the improvement of the present disclosure, the desk lamp includes a short-range wireless interconnection communication (SRWIC) module; the SRWIC module is electrically connected to the control mainboard; when the power button is triggered to be in the first working state, the power button is configured to control turning on and turning off of the SRWIC module; and the SRWIC module is configured to be connected to a playing device.

As the improvement of the present disclosure, the desk lamp further includes a clock module; the clock module is electrically connected to the control mainboard; when the power button is triggered to be in the first working state, the power button controls turning on and turning off of the clock module; and the SRWIC module is electrically connected to the clock module to achieve automatic time calibration by the clock module.

As the improvement of the present disclosure, the desk lamp further includes a fifth toggle button; and the fifth toggle button includes a third working state and a fourth working state.

As the improvement of the present disclosure, when the SRWIC module is turned on and the fifth toggle button is triggered to be in a third working state, the fifth toggle button is configured to control play and pause of the SRWIC module, and the third toggle button and the fourth toggle button are configured to control a play order of the SRWIC module; and when the toggle button group is triggered to be in the sixth working state, the first toggle button and the second toggle button are respectively configured to adjust a volume of the SRWIC module.

As the improvement of the present disclosure, when the clock module is turned on and the fifth toggle button is triggered to be in the fourth working state, the fifth toggle button is configured to set the mode of the clock module; and the third toggle button and the fourth toggle button are configured to adjust a time setting of the clock module.

As the improvement of the present disclosure, the desk lamp further includes a light-emitting diode (LED) display screen; the LED display screen is electrically connected to the control main board; when the power button is triggered to be in the second working state, the power button is configured to turn on or turn off the LED display screen and adjust the brightness of the LED display screen; the desk lamp further includes a speaker; and the speaker is electrically connected to the control main board and is configured to play an audio file.

As the improvement of the present disclosure, the desk lamp includes a base; the base is connected to a lamp post; one end of the lamp post is connected to the base, and the other end is connected to a bulb base; the bulb base is connected to a bulb; and the light-emitting element is arranged in the bulb.

As the improvement of the present disclosure, the first toggle button, the second toggle button, the third toggle button, the fourth toggle button, the touch switch, the fifth toggle button, and the power button are all arranged on the base and are located on an upper surface of the base.

As the improvement of the present disclosure, the control main board is mounted in the base; the LED display screen is mounted on an outer side wall of the base; the speaker is mounted on an upper surface of the base; the base is further provided with a USB power interface and a Type-C power interface; and the USB power interface and the Type-C power interface are located on an outer side wall of the base.

As the improvement of the present disclosure, the desk lamp further includes a lampshade and a lamp cap nut; the lamp cap nut is configured to fixedly connect the lampshade to the bulb base; the bulb is detachably plugged into the bulb base through threaded connection; and the lampshade encloses the bulb base and the bulb.

As the improvement of the present disclosure, the lampshade is internally connected with several connecting rods; one end of each of the connecting rods is fixedly connected to the lampshade, and the other end is connected to a connecting structure; the connecting structure includes two layers of annular fixing pieces; the connecting rod is fixedly connected between the two layers of annular fixing pieces, and the connecting structure is sleeved and connected to the bulb base; and the connecting structure is fixedly mounted on the bulb base through threaded connection via the lamp cap nut, so that the lampshade is connected to the bulb base and encloses the bulb base and the bulb.

As the improvement of the present disclosure, the bulb base is provided with a flange; and when the connecting structure sleeves the bulb base, bottom surfaces of the two layers of annular fixing pieces are connected to a surface of the flange to achieve that the lampshade is fixedly connected to the bulb base.

Beneficial effects: the present disclosure provides a desk lamp. The desk lamp includes a control main board; an alarm clock module, wherein the alarm clock module is electrically connected to the control main board, and the alarm clock module at least includes two alarm clock modes; and a light-emitting element, wherein the light-emitting element is electrically connected to the control main board. The desk lamp can not only be used as a lighting device for emitting lighting rays, but also provide an alarm clock function. A user can set different alarm clock modes and can set two or more alarm clocks at different time according to an actual need. The desk lamp can effectively help the user to better manage the time and improve the life efficiency and quality.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
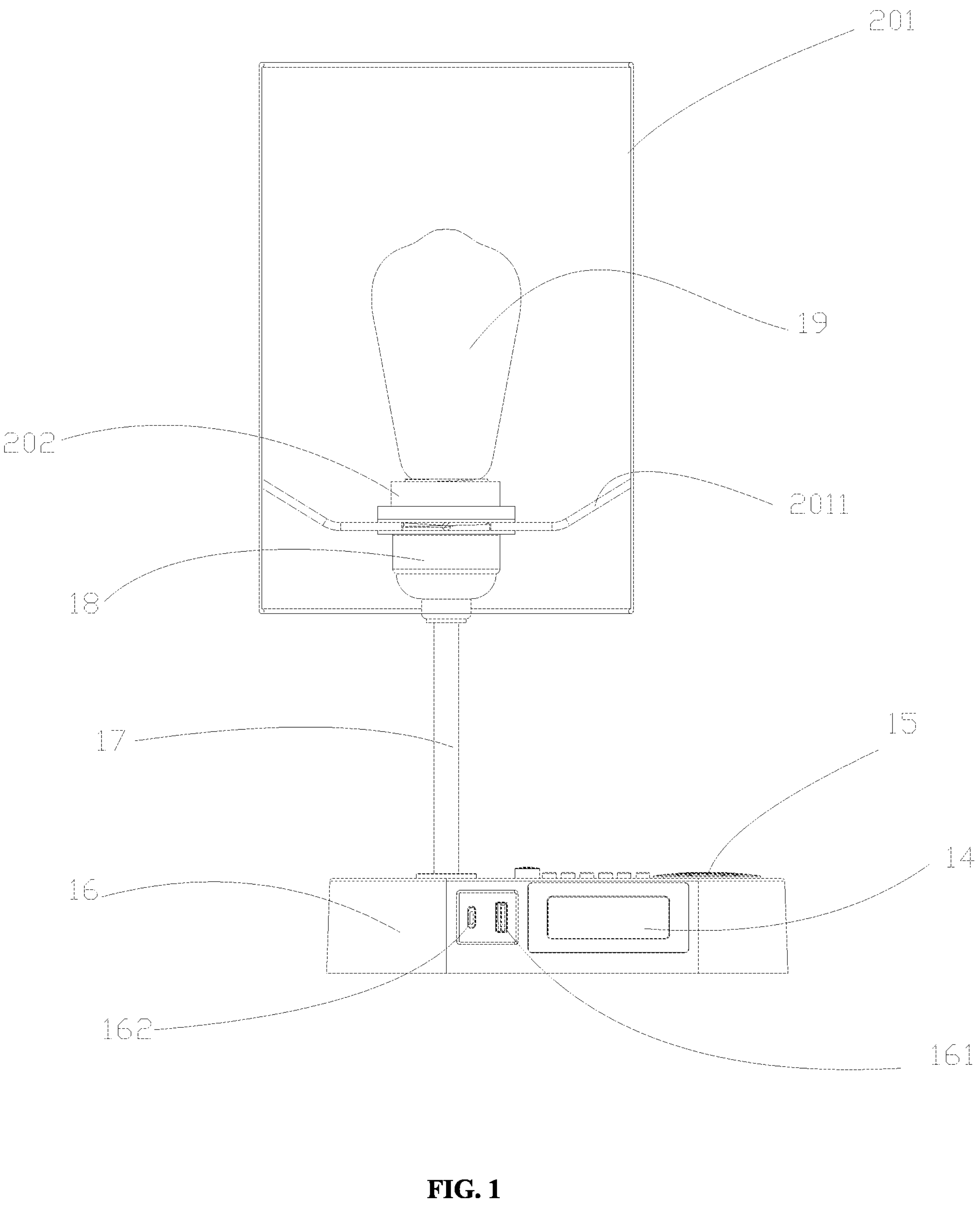
FIG. 1 is a schematic diagram of an overall structure of the present disclosure.
Figure 2:
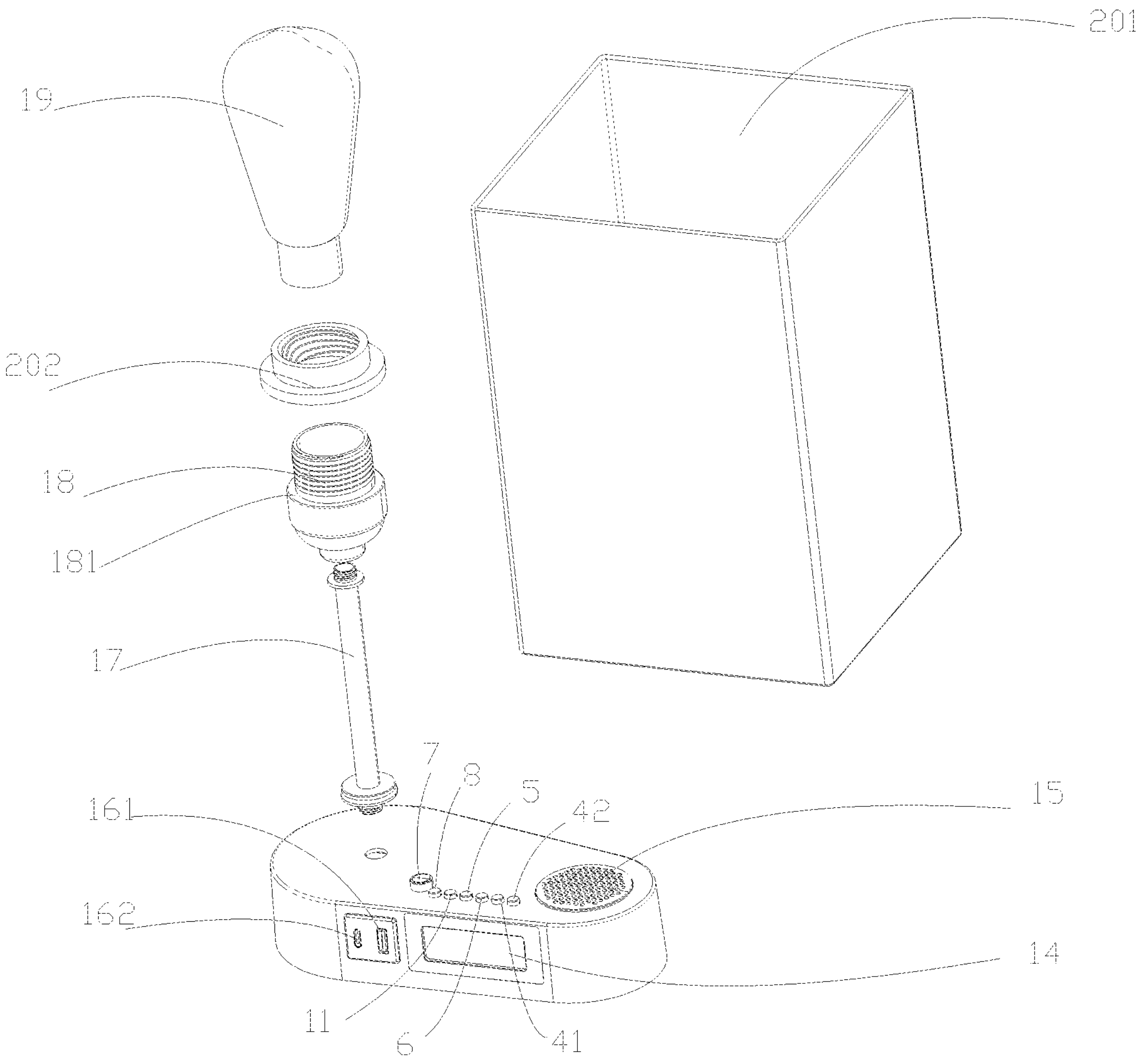
FIG. 2 is an exploded diagram of the present disclosure.
Figure 3:
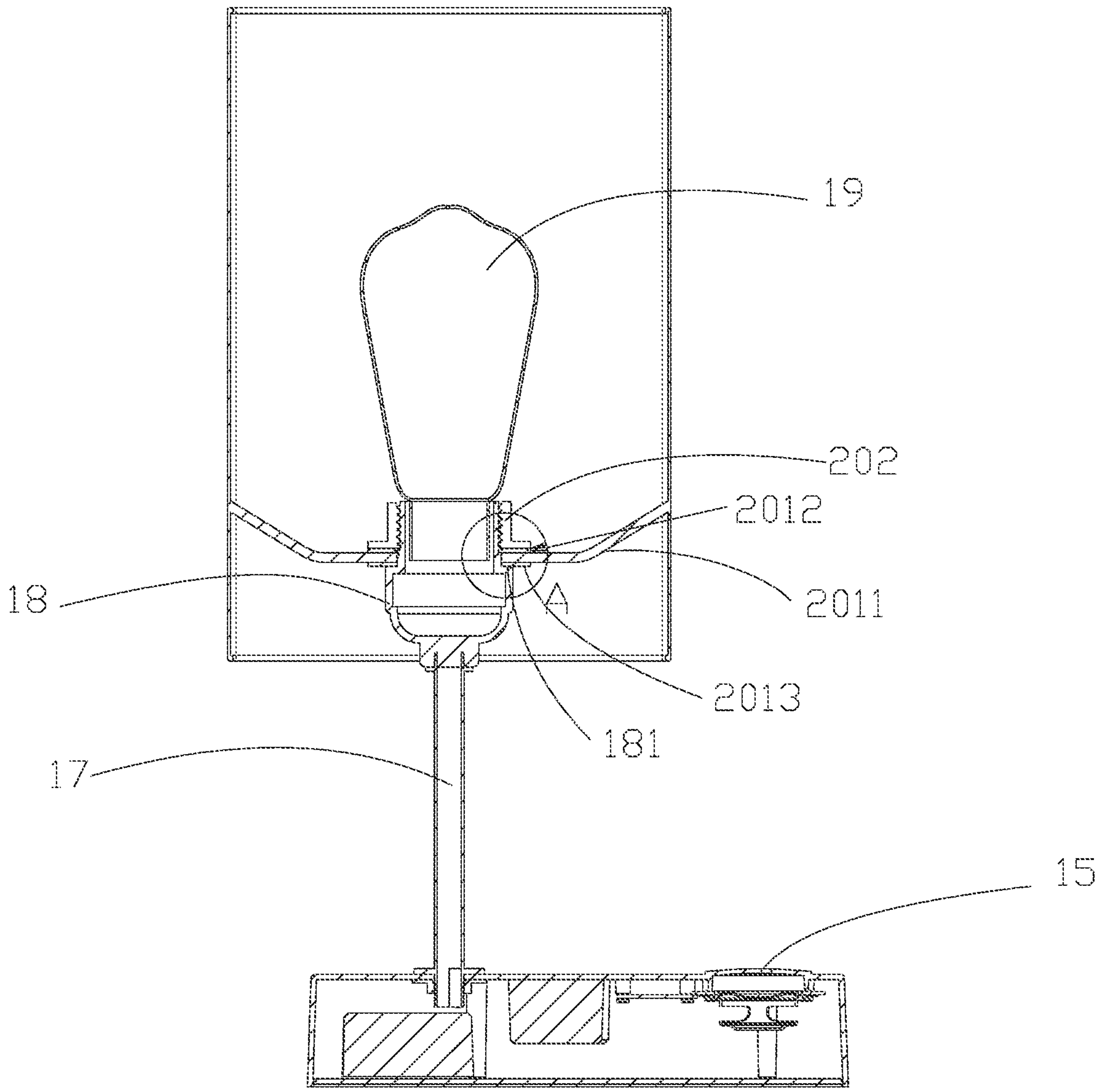
FIG. 3 is a sectional view of the present disclosure.
Figure 4:
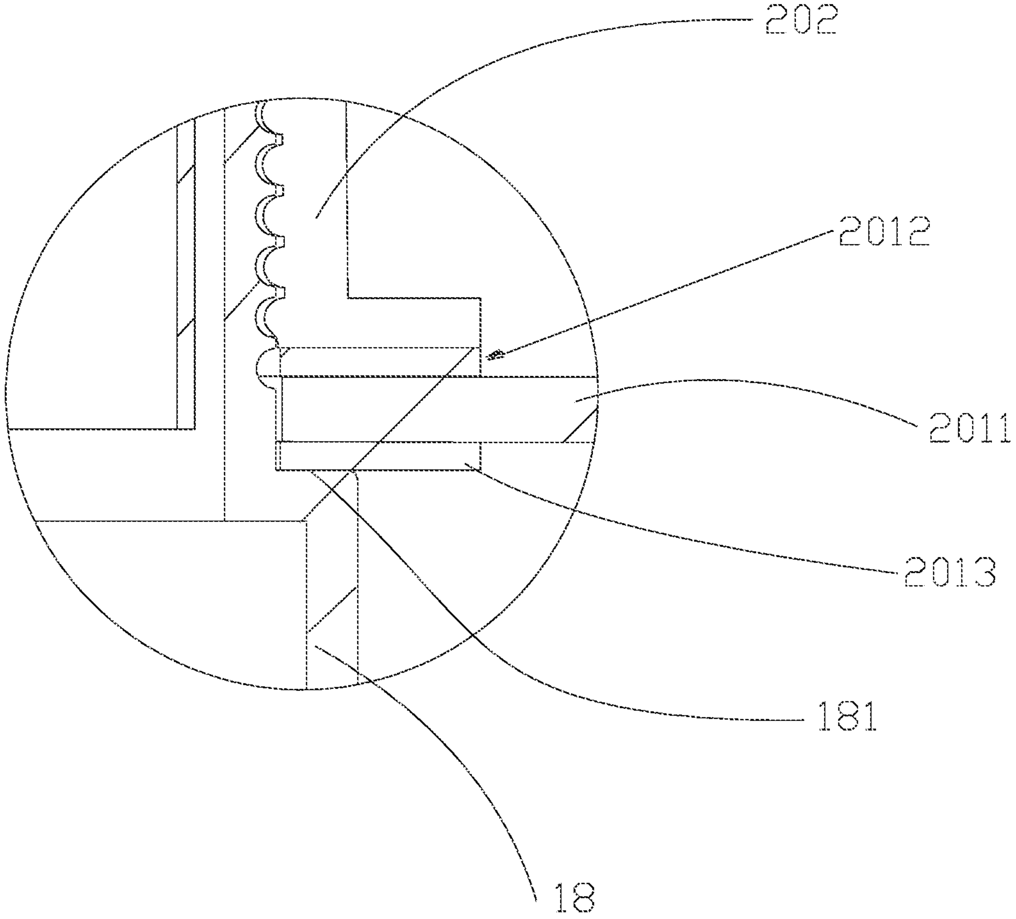
FIG. 4 is an enlarged diagram of the part A in FIG. 3.
Figure 5:
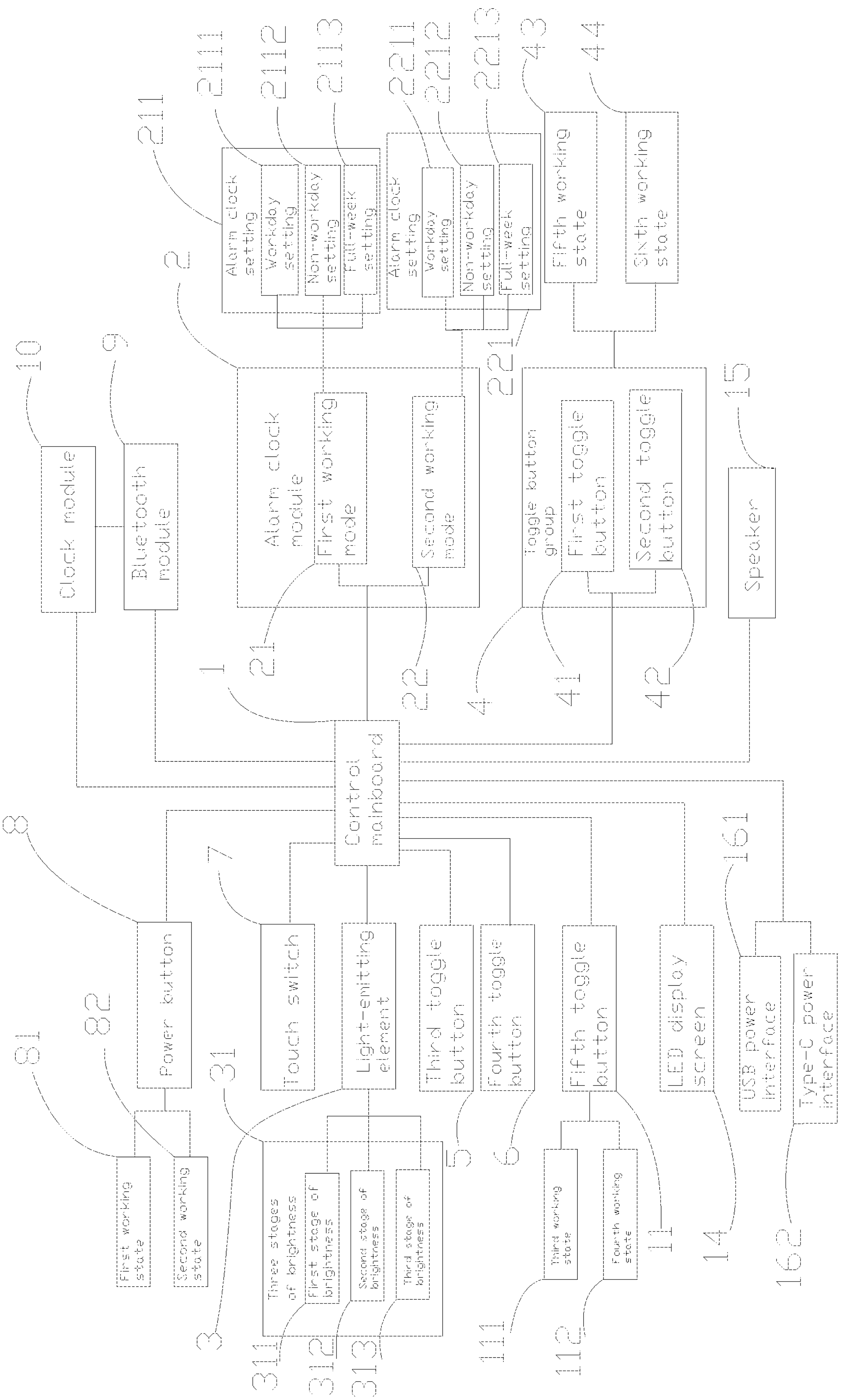
FIG. 5 is a schematic diagram of another overall structure of the present disclosure.

Referring to FIG. 1 to FIG. 5, a desk lamp includes a control main board 1; an alarm clock module 2, wherein the alarm clock module is electrically connected to the control main board 1, and the alarm clock module 2 at least includes two alarm clock modes; and a light-emitting element 3, wherein the light-emitting element 3 is electrically connected to the control main board 1. Through the above structure, the desk lamp can not only be used as a lighting device for emitting lighting rays, but also provide an alarm clock function. A user can set different alarm clock modes and can set two or more alarm clocks at different time according to an actual need. The desk lamp can effectively help the user to better manage the time and improve the life efficiency and quality.

In this embodiment, the desk lamp further includes a toggle button group 4. The toggle button group 4 is electrically connected to the control main board 1 and the alarm clock module 2. The toggle button group includes a fifth working state 43 and a sixth working state 44.

Further, the toggle button group 4 includes a first toggle button 41 and a second toggle button 42. The alarm clock module includes a first working mode 21 and a second working mode 22. When the toggle button group 4 is triggered to be in the fifth working state 43, the first toggle button 41 is configured to perform switching to the first working mode 21. The second toggle button 42 is configured to perform switching to and set the second working mode 22. Specifically, a long press is made on the first toggle button 41 to enter the fifth working state and set the first working mode 21. A long press is made on the second toggle button 42 to enter the fifth working state and set the second working mode 22. Through the above structure, a user can set different alarm clock modes by a long press on the toggle buttons, which effectively achieves the function of the desk lamp to set two alarm clocks at different time.

In this implementation, the desk lamp includes a third toggle button 5 and a fourth toggle button 6. The first working mode 21 includes at least two alarm clock settings 211. The alarm clock settings 211 include a workday setting 2111 and a non-workday setting 2112. The third toggle button 5 and the fourth toggle button 6 are configured to switch different alarm clock settings of the first working mode. The alarm clock setting 211 further includes a full-week mode 2113. Further, the workday setting 2111 is from Monday to Friday, and the non-workday setting 2112 is from Saturday to Sunday. The full-week mode 2113 is from Monday to Sunday. Specifically, a short press is made on the third toggle button 5 or the fourth toggle button 6 to select different settings. After a setting is selected, a short press is made again on the third toggle button 5 or the fourth toggle button 6 to select time and stay for 3 s, thereby completing the setting of the first working mode.

In this embodiment, the second working mode 22 includes at least two alarm clock settings 221. The alarm clock settings 221 include a workday setting 2211 and a non-workday setting 2212. The third toggle button 5 and the fourth toggle button 6 are configured to perform switching between different alarm clock settings of the second working mode 22. The alarm clock setting 221 further includes a full-week setting 2213. Further, the workday setting 2211 is from Monday to Friday, and the non-workday setting 2212 is from Saturday to Sunday. The full-week mode 2213 is from Monday to Sunday. Specifically, a short press is made on the third toggle button 5 or the fourth toggle button 6 to select different settings. After a setting is selected, a short press is made again on the third toggle button 5 or the fourth toggle button 6 to select time and stay for 3 s, thereby completing the setting of the second working mode.

In this embodiment, the desk lamp further includes a touch switch 7. The touch switch 7 is electrically connected to the control main board 1. The touch switch 7 is configured to control brightness of the light-emitting element 3.

Further, the light-emitting element 3 has three stages of brightness 31. When the touch switch is touched for the first time, the light-emitting element 3 is turned on at the first stage of brightness 311. When the touch switch is touched for the second time, the light-emitting element 3 is turned on at the second stage of brightness 312. When the touch switch is touched for the third time, the light-emitting element 3 is turned on at the third stage of brightness 313. When the touch switch is touched for the fourth time, the light-emitting element 3 is turned off. Through the above structure, the touch switch 7 is easy and visual to operate. A user only needs to touch a surface of the switch 7 to control the light-emitting element 3. Because of the design of the three stages of brightness 31, the user is allowed to adjust the brightness of light according to a need, so that the user can select appropriate brightness according to different situations and a personal preference, so as to relieve eye fatigue and provide a more comfortable reading and working environment.

In this embodiment, the desk lamp further includes a power button 8. The power button 8 is electrically connected to the control main board 1. The power button 8 includes a first working state 81 and a second working state 82.

Further, the desk lamp includes a short-range wireless interconnection communication (SRWIC) module 9 which is a BLUETOOTH® module. The SRWIC module 9 is electrically connected to the control mainboard 1. When the power button 8 is triggered to be in the first working state 81, the power button 8 is configured to control turning on and turning off of the SRWIC module 9. The SRWIC module 9 is configured to be connected to a playing device. Specifically, a short press is made on the power button 8 to enter the first working state 81 and control the SRWIC module 9 to be turned on or turned off. Through the above structure, the turning on and turning off of the SRWIC module 9 are effectively achieved. The SRWIC module 9 improves the multifunctionality of the desk lamp.

Further, the desk lamp further includes a clock module 10. The clock module 10 is electrically connected to the control mainboard 1. When the power button 8 is triggered to be in the first working state 81, the power button 8 controls turning on and turning off of the clock module 10. The SRWIC module 9 is electrically connected to the clock module 10 to achieve automatic time calibration by the clock module 10. Specifically, when the clock module 10 needs to be set, a short press is made on the power button 8 while SRWIC module 9 is in an on state, so that the power button 8 enters the first working state 81. In this case, the SRWIC module 9 is turned off, and clock module 10 is turned on. Through the above structure, the clock module 10 is configured to display time. The clock module is electrically connected to the SRWIC module 9, so that the accuracy of time can be ensured. The clock module can be manually set, so as to ensure that correct time can be manually set when the teeth SRWIC module fails to be connected to an external device.

In this embodiment, the desk lamp further includes a fifth toggle button 11. The fifth toggle button 11 includes a third working state 111 and a fourth working state 112.

Further, when the SRWIC module 9 is turned on, and the fifth toggle button 11 is triggered to be in the third working state 111, the fifth toggle button 11 is configured to control play and pause of the SRWIC module 9, and the third toggle button 5 and the fourth toggle button 16 are configured to control a play order of the SRWIC module 9. When the toggle button group 4 is triggered to be in the sixth working state 44, the first toggle button 41 and the second toggle button 42 are respectively configured to adjust a volume of the SRWIC module 9. Specifically, when the SRWIC module 9 is in an on state, a short press is made on the fifth toggle button 11 to enter the third working state 111 and control the play or pause of the SRWIC module 9. When the SRWIC module 9 is used for playing, a short press on the third toggle button 5 or the fourth toggle button 6 to control the play order of the SRWIC module 9. In this case, a short press is made on the first toggle button 41 to enter the sixth working state 44 and control the volume of the SRWIC module 9 to increase or decrease. A short press on the second toggle button 42 to enter the sixth working state 44 and control the volume of the SRWIC module 9 to increase or decrease.

In this embodiment, when the clock module 10 is turned on and the fifth toggle button 11 is triggered to be in the fourth working state 112, the fifth toggle button 11 is configured to set the mode of the clock module 10. The third toggle button 5 and the fourth toggle button 6 are configured to adjust a time setting of the clock module 10. The clock module is a twelve-hour mode, including a morning mode and an afternoon mode. Specifically, when the clock module 10 is turned on, a long press is made on the fifth toggle button 11 to enter the fourth working state 112 and select the morning mode and afternoon mode. Then, a short press is made on the third toggle button 5 or the fourth toggle button 6 to adjust the time. After stay for 3 seconds, this will be automatically confirmed to complete the setting of the clock module setting.

In this embodiment, the desk lamp further includes an LED display screen 14. The LED display screen 14 is electrically connected to the control main board 1. When the power button 8 is triggered to be in the second working state 82, the power button 8 can be configured to turn on or turn off the LED display screen 14 and adjust the brightness of the LED display screen 14. Specifically, a long press is made on the power button 8 to enter the second working state 82 to adjust the brightness of the LED display screen 14. The desk lamp further includes a speaker 15. The speaker 15 is electrically connected to the control main board 1 and is configured to play an audio file.

In this embodiment, the desk lamp includes a base 16. The base 16 is connected to a lamp post 17. One end of the lamp post 17 is connected to the base 16, and the other end is connected to a bulb base 18. The bulb base 18 is connected to a bulb 19. The light-emitting element 3 is arranged in the bulb 19. The lamp pole 17 is connected to both the base 16 and the bulb base 18 through threaded connection to improve the stability of the desk lamp.

In this embodiment, the first toggle button 41, the second toggle button 42, the third toggle button 5, the fourth toggle button 6, the touch switch 7, the fifth toggle button 11, and the power button 8 are all arranged on the base 16 and are located on an upper surface of the base 16.

In this embodiment, the control main board 1 is mounted in the base 16. The LED display screen 14 is mounted on an outer side wall of the base 16. The speaker 15 is mounted on an upper surface of the base 16. The base is further provided with a USB power interface 161 and a Type-C power interface 162. The USB power interface 161 and the Type-C power interface 162 are located on an outer side wall of the base 16.

In this embodiment, the desk lamp further includes a lampshade 201 and a lamp cap nut 202. The lamp cap nut 202 is configured to fixedly connect the lampshade 201 to the bulb base 18. The bulb 19 is detachably plugged into the bulb base 18 through threaded connection. The lampshade 201 encloses the bulb base 18 and the bulb 19. The lampshade is a transparent lampshade.

Furthermore, the lampshade 201 is internally connected with several connecting rods 2011. One end of each of the connecting rods 2011 is fixedly connected to the lampshade 201, and the other end is connected to a connecting structure 2012. The connecting structure 2012 includes two layers of annular fixing pieces 2013. The connecting rod 2011 is fixedly connected between the two layers of annular fixing pieces 2013, and the connecting structure 2012 can be sleeved and connected to the bulb base 18. The connecting structure 2012 is fixedly mounted on the bulb base 18 through threaded connection via the lamp cap nut 202, so that the lampshade 201 is connected to the bulb base 18 and encloses the bulb base 18 and the bulb 19.

Further, the bulb base 18 is provided with a flange 181. When the connecting structure 2012 sleeves the bulb base 18, bottom surfaces of the two layers of annular fixing pieces 2013 are connected to a surface of the flange 181 to achieve that the lampshade 201 can be fixedly connected to the bulb base 18. Through the above structure, a user can first sleeve the bulb base 18 with the connecting structure 2012, and then arrange the lamp cap nut 202 above the two layers of annular fixing pieces 2013 in a sleeving manner. The lamp cap nut 202 is in threaded connection with the bulb base 18, so that the lamp cap nut 202 can fix the two layers of annular fixing pieces 2013 between the lamp cap nut 202 and the bulb base 18. The flange 181 is configured to support the two layers of annular fixing pieces 2013, so as to prevent the two layers of annular fixing pieces 2013 from sliding down from the bulb base 18, thereby enabling the lampshade 201 to be fixedly connected to the bulb base 18. The design is simple and ingenious.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

What is claimed is:

1. A desk lamp, comprising:

a control main board;

an alarm clock module electrically connected to the control main board, and the alarm clock module at least having first and second working modes;

a light-emitting element electrically connected to the control main board;

a clock module;

a short-range wireless interconnection communication (SRWIC) module; and a power button electrically connected to the control main board, the power button comprising a first working state and a second working state;

wherein the clock module is electrically connected to the control main board; when the power button is triggered to be in the first working state, the power button controls turning on and turning off of the clock module; and the SRWIC module is electrically connected to the clock module to achieve automatic time calibration by the clock module.

2. The desk lamp according to claim 1, wherein the SRWIC is electrically connected to the control main board; when the power button is triggered to be in the first working state, the power button is configured to control turning on and turning off of the SRWIC module; and the SRWIC module is configured to be connected to a playing device.

3. The desk lamp according to claim 1, wherein the SRWIC module is a BLUETOOTH® module.

4. The desk lamp according to claim 1, further comprising a touch switch electrically connected to the control main board; and the touch switch configured to control brightness of the light-emitting element.

5. The desk lamp according to claim 4, wherein the light-emitting element has three stages of brightness; when the touch switch is touched for the first time, the light-emitting element is turned on at the first stage of brightness; when the touch switch is touched for the second time, the light-emitting element is turned on at the second stage of brightness; when the touch switch is touched for the third time, the light-emitting element is turned on at the third stage of brightness; and when the touch switch is touched for the fourth time, the light-emitting element is turned off.

6. The desk lamp according to claim 1 further comprising a toggle button group electrically connected to the control main board and the alarm clock module, the toggle button group comprises a third working state and a fourth working state.

7. The desk lamp according to claim 6, wherein the toggle button group comprises a first toggle button and a second toggle button; and when the toggle button group is triggered to be in the third working state, the first toggle button is configured to perform switching to and set the first working mode; and the second toggle button is configured to perform switching to and set the second working mode.

8. The desk lamp according to claim 7, wherein the desk lamp comprises a third toggle button and a fourth toggle button; the first working mode comprises at least two alarm clock settings; the alarm clock settings comprise a workday setting and a non-workday setting; and the third toggle button and the fourth toggle button are configured to switch different alarm clock settings of the first working mode.

9. The desk lamp according to claim 8, wherein the second working mode comprises at least two alarm clock settings; and the third toggle button and the fourth toggle button are configured to perform switching between different alarm clock settings of the second working mode.

10. The desk lamp according to claim 1, further comprising a fifth toggle button; wherein the fifth toggle button comprises a fifth working state and a sixth working state.

11. The desk lamp according to claim 10, wherein when the SRWIC module is turned on and the fifth toggle button is triggered to be in the fifth working state, the fifth toggle button is configured to control play and pause of the SRWIC module, and the third toggle button and the fourth toggle button are configured to control a play order of the SRWIC module; and when the toggle button group is triggered to be in the fourth working state, the first toggle button and the second toggle button are respectively configured to adjust a volume of the SRWIC module.

12. The desk lamp according to claim 11, wherein when the clock module is turned on and the fifth toggle button is triggered to be in the sixth working state, the fifth toggle button is configured to set the mode of the clock module; and the third toggle button and the fourth toggle button are configured to adjust a time setting of the clock module.

13. The desk lamp according to claim 12, further comprising a light-emitting diode (LED) display screen electrically connected to the control main board; wherein when the power button is triggered to be in the second working state, the power button is configured to turn on or turn off the LED display screen and adjust the brightness of the LED display screen; and a speaker electrically connected to the control main board and is configured to play an audio file.

14. The desk lamp according to claim 13, further comprising:

a lamp post having two ends;

a base connected to one end of the lamp post;

a bulb base connected at the other end of the lamp post; and a bulb connected to the bulb base with the light-emitting element arranged in the bulb.

15. The desk lamp according to claim 14, wherein the first toggle button, the second toggle button, the third toggle button, the fourth toggle button, the touch switch, the fifth toggle button, and the power button are all arranged on the base and are located on an upper surface of the base.

16. The desk lamp according to claim 15, wherein the control main board is mounted in the base; the LED display screen is mounted on an outer side wall of the base; the speaker is mounted on an upper surface of the base; the base is further provided with a USB power interface and a Type-C power interface; and the USB power interface and the Type-C power interface are located on an outer side wall of the base.

17. The desk lamp according to claim 16, further comprising a lampshade; and a lamp cap nut, wherein the lamp cap nut is configured to fixedly connect the lampshade to the bulb base, the bulb is detachably plugged into the bulb base through threaded connection; and the lampshade encloses the bulb base and the bulb.

18. The desk lamp according to claim 17, wherein the lampshade is internally connected with several connecting rods; one end of each of the connecting rods is fixedly connected to the lampshade, and the other end is connected to a connecting structure; the connecting structure comprises two layers of annular fixing pieces; the connecting rod is fixedly connected between the two layers of annular fixing pieces, and the connecting structure is sleeved and connected to the bulb base; and the connecting structure is fixedly mounted on the bulb base through threaded connection via the lamp cap nut, so that the lampshade is connected to the bulb base and encloses the bulb base and the bulb.

19. The desk lamp according to claim 18, wherein the bulb base is provided with a flange; and when the connecting structure sleeves the bulb base, bottom surfaces of the two layers of annular fixing pieces are connected to a surface of the flange to achieve that the lampshade is fixedly connected to the bulb base.

* * * * *